United States Patent [19]

Goel

[11] Patent Number: 4,636,558

[45] Date of Patent: Jan. 13, 1987

[54] POLYMER FROM BICYCLIC AMIDE ACETAL-EPOXIDE MONOMER AND DICARBOXYLIC ACID ANHYDRIDE

[75] Inventor: Anil B. Goel, Worthington, Ohio

[73] Assignee: Ashland Oil, Inc., Ashland, Ky.

[21] Appl. No.: 809,600

[22] Filed: Dec. 16, 1985

[51] Int. Cl.$^4$ .............................................. C08G 83/00
[52] U.S. Cl. .................................. 528/363; 528/366; 528/403; 528/421; 528/423
[58] Field of Search ................................. 528/363, 366

[56] References Cited

U.S. PATENT DOCUMENTS 4,474,942  10/1984  Sano et al. ........................... 528/363
4,579,937   4/1986  Masuda et al. ....................... 528/363

Primary Examiner—Harold D. Anderson
Attorney, Agent, or Firm—John F. Jones

[57] ABSTRACT

The process for preparing a novel thermoset polymer comprising copolymerizing a monomer containing both bicyclic amide acetal and epoxy groups with a dicarboxylic acid anhydride is described.

12 Claims, No Drawings

POLYMER FROM BICYCLIC AMIDE ACETAL-EPOXIDE MONOMER AND DICARBOXYLIC ACID ANHYDRIDE

This invention relates to a process for preparing novel thermoset polymers by the reaction of mixed bicyclic amide acetal-epoxide monomers with dicarboxylic acid anhydrides.

The preparation of novel mixed bicyclic amide acetal-expodie monomers has been described in copending U.S. patent application Ser. No. 766,361, filed Aug. 16, 1985.

I have discovered that mixed bicyclic amide acetal-epoxide monomers will react readily with dicarboxylic acid anhydrides to give thermoset polymers containing poly (amide-ester) groups without the evolution of any volatile by-products. The process and novel polymers of my invention are useful in applications such as in reaction injection molding (RIM), structural adhesives and polymer composites.

The mixed bicyclic amide acetal-epoxide monomers useful in this invention include those having the Formula

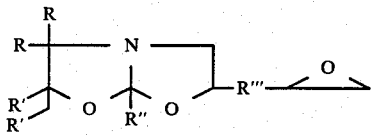

wherein R, R and R" independently represent hydrogen, an alkyl group having from 1 to 20 carbon atoms, an aryl group having from 6 to 12 carbon atoms, or an alkaryl group having from 7 to 20 carbon atoms and R''' represents an alkylene group having from 1 to 20 carbon atoms, an arylene group having from 6 to 20 carbon atoms, an alkarylene group having from 7 to 20 carbon atoms, an alkylene ether group having from 1 to 50 carbon atoms or an arylene ether group having from 6 to 50 carbon atoms.

The dicarboxylic acid anhydrides useful in this invention include those having the Formula II

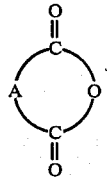

wherein A represents a saturated or unsaturated linear or cyclic alkylene group having from 1 to 20 carbon atoms or an arylene group having from 6 to 20 carbon atoms. The representative dicarboxylic acid anhydrides include maleic anhydride, succinic anhydride, glutaric anhydride, alkyl and alkenyl succinic anhydride, tetrahydro and hexahydro phthalic anhydride, nadic anhydride, phthalic anhydride, 5-norbornene-2, 3-dicarboxylic ahydride, the methyl cyclopentadiene anhydride adduct of maleic anhydride, oligomers and polymers of maleic anhydride copolymerization. Other typical anhydrides which may be employed are described in U.S. Pat. No. 3,329,652.

It is believed that dicarboxylic anhydrides react first with the bicyclic amide acetal functionality of monomer I and the amide acetal group also catalyzes the epoxide/anhydride reaction. Because of this probable difference in the reactivity rates of bicyclic amide acetal and epoxide groups, it should be possible to prepare poly (amide ester) polymers containing pendant epoxy groups by using the molar ratio of dicarboxylic anhydride to monomer I of from 1:1 to 1 to greater than 1.

In the process of this invention it is sometimes desirable to use a catalyst such as organo antimony, organo phosphine (e.g., triphenylphosphine), tertiary amine, stannous carboxylate, cationic catalysts etc. known to catalyze the epoxy/anhydride polymerization.

In the process of this invention other known additives which react with discarboxylic anhydrides such as epoxy resins, oxazolines, and the like may also be added.

The process of this invention is preferably carried out at a temperature in the range of from 20 degrees C. up to 250 degrees C. and at a pressure of from about atmospheric up to about 100 atmospheres. Depending on the application, fillers, plasticizers etc. may also be included.

This invention is further illustrated in the following illustrative examples.

EXAMPLE 1

To 1.3 g of a mixed bicyclic amide acetal-epoxide monomer prepared by the reaction of 2-methyl-2-oxazoline with vinyl cyclohexeme di epoxide and having the formula

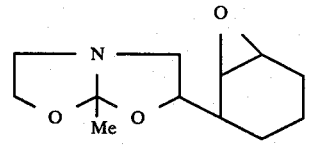

was added 0.015 g of triphenylphosphine and to the resulting solution was added 1.5 g of hexahydrophthalic anhydride at 30 degrees C. An exothermic reaction occurred within 20 seconds to give a highly viscous paste which turned to gelled polymeric material within one minute. The polymer was postcured at 160 degrees C. for two hours. The solid polymer was found to be insoluble in solvents such as N-methyl pyrrolidone (NMP) and dimethyl formamide (DMF). The polymer was found to have a Tg by differential scanning calorimetry (DSC) of 135 degrees C. and a 10% weight loss in nitrogen by thermal gravimetric analysis (TGA) occured at 359 degrees C.

EXAMPLE 2

The procedure of Example 1 was followed using 1.2 g of a mixed bicyclic amide acetal-epoxide monomer having the formula

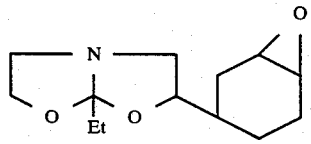

, 0.015 of triphenyl phosphine and 1.5 g of hexahydrophthalic anhydride (HHPA). An exothermic reaction occurred within one minute to give the solid polymer which was postcured at 160 degrees C. for two hours to give a thermoset polymer insoluble in NMP and DMF.

The Tg by DSC was found to be 128.4 degrees C. and a 10% weight loss in nitrogen occurred at 325 degrees C.

EXAMPLE 3

The procedure of Example 1 was followed using 4.5 g of the bicyclic amide acetal-epoxide monomer described in Example 1, 0.02 g of triphenyl phosphine and 6 g of 5-norbornene-2,3-dicarboxylic anhydride. An exothermic reaction occurred within one minute to give a solid polymer which upon postcuring at 160 degrees C. for one hour gave a thermoset polymer insoluble in NMP and DMF. The Tg for this polymer by DSC was found to be 132 degrees C. and a 10% weight loss occurred in the polymer at 385 degrees C.

EXAMPLE 4

The procedure of Example 1 was followed using 1.15 g of the bicyclic amide acetal-epoxide monomer described in Example 1, 0.015 g of triphenyl phosphine and 3.4 g of isobutyl succinic anhydride (equivalent weight 342). The resulting mixture gelled in one minute and the thermoset polymer obtained after a post curing at 160 degrees C. was found to be insoluble in NMP. A small portion of the material before polymerization was applied between two 1 inch by 4 inch cold rolled steel plates with a one square inch overlap and the adhesive was applied at a 10-20 mil thickness. This adhesive test specimen was heated at 120 degrees C. for 15 minutes and the lap shear strength was found to be 880 psi.

EXAMPLE 5

The procedure of Example 1 was followed using 1.2 g of a bicyclic amide acetal-epoxide monomer of the formula

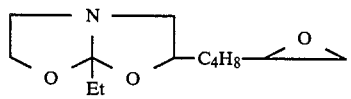

, 0.01 g of triphenyl phosphine and 1.5 g of hexahydrophthalic anhydride. The resulting mixture formed a clear solution within 20 seconds and it gelled in about one minute. The resulting polymer which was postcured at 160 degrees C. for two hours was found to be insoluble in NMP. The Tg for this polymer by DSC was found to be 83.5 degrees C. and a 10% weight loss in nitrogen occurred at 333 degrees.

EXAMPLE 6

The bicyclic amide acetal-epoxide monomer described in Example 1 (2.2 g) was mixed with 0.01 g of triphenyl phosphine and the resulting solution was mixed rapidly with 3.0 g of 5-nonbornene-2,3-dicarboxylic acid anhydride. An exothermic reaction occurred within 30 seconds to give a pasty material. A portion of this was tested as an adhesive by applying it between two 1 inch by 4 inch cold rolled steel plates covering one square inch area with a 20 mil thickness of the adhesive and was postcured at 120 degrees C. for 20 minutes. The remaining solid, which was soluble in NMP, was found to have a softening point of about 100 degrees C. at which it resolidified rapidly to give an NMP insoluble solid. The adhesive sample showed a lap shear strength of 775 psi.

I claim:

1. The process for preparing a thermoset polymer comprising copolymerizing a monomer having the formula

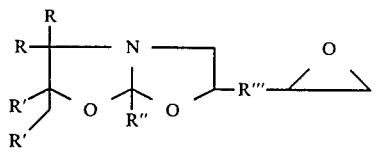

wherein R, R' and R" independently represent hydrogen, an alkyl group having from 1 to 20 carbon atoms, an aryl group having from 6 to 12 carbon atoms, an alkaryl group having from 7 to 20 carbon atoms and R''' represents an alkylene group having from 1 to 20 carbon atoms, an arylene group having from 6 to 20 carbon atoms, an arylene group having from 7 to 20 carbon atoms, an alkylene ether group having from 1 to 50 carbon atoms or an arylene ether group having from 6 to 50 carbon atoms with a dicarboxylic acid anhydride.

2. The process of claim 1 wherein the dicarboxylic acid anhydride is one having the formula

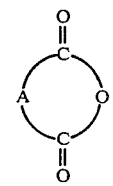

wherein A represents a saturated or unsaturated linear or cyclic alkylene group having from 1 to 20 carbon atoms or an arylene group having from 6 to 20 carbon atoms.

3. The process of claim 2 carried out at a temperature in the range of from 20° C. up to 250 degrees C.

4. The process of claim 3 wherein the molar ratio of dicarboxylic acid anhydride to the monomer is at least 1:1.

5. The process of claim 4 wherein the monomer is one having the formula

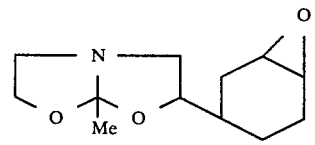

6. The process of claim 4 wherein the monomer is one of the formula

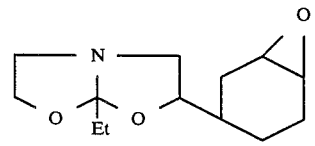

7. The process of claim 5 wherein the dicarboxylic acid anhydride is hexahydrophthalic anhydride.

8. The process of claim 6 wherein the dicarboxylic acid anhydride is hexahydro phthalic anhydride.

9. The process of claim 5 wherein the dicarboxylic acid anhydride is 5-norbornene-2,3-dicarboxylic anhydride.

10. the process of claim 5 wherein the dicarboxylic acid is isobutyl succinic anhydride.
11. The process of claim 4 wherein the monomer is one having the formula
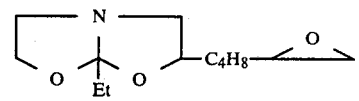
12. The thermoset polymer produced by the process of claim 1.
* * * * *